(12) United States Patent
Walmsley et al.

(10) Patent No.: US 7,599,067 B2
(45) Date of Patent: Oct. 6, 2009

(54) ULTRA-SHORT OPTICAL PULSE MEASUREMENT USING A THICK NONLINEAR CRYSTAL

(75) Inventors: Ian A. Walmsley, Oxford (GB);
Aleksandr S. Radunsky, Oxford (GB);
Simon-Pierre Gorza, Oxford (GB)

(73) Assignee: Isis Innovation Limited (GB)

( * ) Notice: Subject to any disclaimer, the term of this patent is extended or adjusted under 35 U.S.C. 154(b) by 101 days.

(21) Appl. No.: 11/914,888

(22) PCT Filed: May 18, 2006

(86) PCT No.: PCT/GB2006/001823

§ 371 (c)(1),
(2), (4) Date: Dec. 14, 2007

(87) PCT Pub. No.: WO2006/123148

PCT Pub. Date: Nov. 23, 2006

(65) Prior Publication Data

US 2008/0212103 A1    Sep. 4, 2008

(30) Foreign Application Priority Data

May 20, 2005    (GB)    ................ 0510338.7

(51) Int. Cl.
*G01B 9/02*    (2006.01)
(52) U.S. Cl. .................................. 356/450
(58) Field of Classification Search .......... 356/450
See application file for complete search history.

(56) References Cited

U.S. PATENT DOCUMENTS 6,633,386 B2    10/2003    Walmsley et al.

(Continued)

FOREIGN PATENT DOCUMENTS

WO    9906794 A1    2/1999

OTHER PUBLICATIONS

O'Shea et al, Highly Simplified Device for Ultrashort-Pulse Measurement, Jun. 15, 2001, Optics Letters Opt Soc America USA, vol. 26, No. 12, pp. 932-934.

(Continued)

*Primary Examiner*—Tarifur Chowdhury
*Assistant Examiner*—Jonathan M Hansen
(74) *Attorney, Agent, or Firm*—Brooks Kushman P.C.

(57) ABSTRACT

The invention provides a pulse measurement apparatus and corresponding method. The apparatus comprises: a splitter for splitting a pulse to be measured into two sub-pulses propagating along different beam paths; a non-linear medium, capable of up-conversion of radiation propagating therethrough, arranged in said beam paths; at least one element for interfering the up-converted pulses resulting from propagation of the two sub-pulses in the non-linear medium; and detection apparatus for detecting the result of the interference to obtain at least one of spectral and temporal characteristics of the pulse to be measured. In the non-linear medium, each sub-pulse can be resolved into an o-wave component and an e-wave component propagating through the medium at a predetermined angle, and the phase-matching function for up-conversion by interaction of the o-wave component with the e-wave component in the non-linear medium is selected such that up-conversion is substantially independent of frequency for one of the o-wave or e-wave over a predetermined frequency range, and is frequency selective for the other of the o-wave and e-wave. This phase-matching function produces spectrally-sheared up-converted replicas of the pulse to be measured.

18 Claims, 3 Drawing Sheets

U.S. PATENT DOCUMENTS

2002/0057435 A1     5/2002    Trebino
2006/0088259 A1*   4/2006    Weiner ........................ 385/122

OTHER PUBLICATIONS

O'Shea et al, Practical Issues In Ultra-Short-Pulse Measurements With 'Grenouille', Oct. 2004, Applied Physics B (Lasers and Optics), vol. B79, No. 6, pp. 683-691.

Radzewicz et al, A Poor Man's FROG, Dec. 15, 2000, Optics Communications, vol. 186, Issues 4-6, pp. 329-333.

Akturk et al, Extremely Simple Device for Measuring 20-fs Pulses, May 1, 2004, Optics Letters Opt Soc America USA, vol. 29, No. 9, pp. 1025-1027.

Radunsky et al, Simplified Spectral Phase Interferometry for Direct Electric-Field Reconstruction Using a Thick Nonlinear Crystal, May 22, 2005, Conference on Lasers and Electronics (CLEO), IEEE, vol. 3, pp. 1820-1822.

* cited by examiner

ULTRA-SHORT OPTICAL PULSE MEASUREMENT USING A THICK NONLINEAR CRYSTAL

The present invention relates to the measurement of electromagnetic radiation pulses, and in particular the characterization of at least one of the amplitude and phase of such pulses. The invention is particularly, but not exclusively, applicable to the measurement of ultra short pulses which may have a duration from less than 10 femto seconds to more than a few hundreds of femto seconds, for example 20 to 50 femto seconds. The pulses of electromagnetic radiation may also be referred to as optical pulses, but this term is not limited to the visible part of the electromagnetic spectrum; it also encompasses at least ultra violet and infrared radiation.

Ultra short optical pulses have many applications including telecommunications, materials processing, biological imaging such as two-photon microscopy, molecular mass spectrometry, TeraHertz radiation sensing, as well as being a fundamental research tool in physics and chemistry. For these applications, the shape of the pulse can be important, consequently it is desirable to be able to measure or characterize the pulse, for example to obtain information on the pulse envelope amplitude and on the relative phases of the spectral components of the pulse. However, direct measurement of these using conventional detectors is not feasible because the response time of conventional detectors is much slower than the duration of a pulse which might only be of the order of 10 femto seconds.

To overcome this problem, interferometry can be used. One technique is known as spectral phase interferometry for direct electric-field reconstruction (SPIDER), and apparatus is commercially available that employs this technique. An example of one such prior technique will now be explained with reference to FIG. 1 of the accompanying drawings which shows the apparatus highly schematically. An ultra short pulse generated using known laser apparatus is input from the left. The profile of the pulse envelope is indicated schematically at 10. The pulse impinges on an etalon 12 which reflects the radiation down path 14; in fact two reflections occur, off the etalon's front and back surfaces, such that two substantially identical replicas of the original pulse 10 are created, denoted 10a and 10b, one of which is delayed in time with respect to the other. Most of the incident pulse is transmitted through the etalon 12 and encounters a beam stretcher 16, which stretches the pulse by dispersion on a grating, to produce a highly chirped pulse with profile schematically indicated at 10c. The chirped pulse is not only a stretched form of the input pulse, but the dispersion means that different portions of the radiation along its length have different wavelengths, for example longer wavelengths towards the front of the pulse and shorter wavelengths towards the rear (or equally lower frequencies towards the front and higher frequencies towards the rear).

The pulses 10a, 10b and 10c are then combined in a non-linear crystal 18 which generates radiation at the sum of the instantaneous frequencies of the pulses incident on it, also known as up-conversion. Thus the first pulse 10a is combined with a quasi-monochromatic slice of the pulse 10c to produce a replica of the original pulse that is up-converted by the frequency of the particular portion of the chirped pulse. Similarly, the time delayed pulse 10b is up-converted to produce a replica of the original pulse, but the frequency shift of the up-conversion is by a different amount than for the first pulse because it interacts with a different portion of the chirped pulse. The resulting radiation is analysed by a spectrometer 20.

The apparatus operates on the principle of a shearing interferometer. The duplicate pulses 10a and 10b are temporally sheared with respect to each other, and after up-conversion they are also spectrally sheared with respect to each other because of interacting with different frequency portions of the chirped pulse 10c. The interferogram recorded by the spectrometer 20 after up-conversion by the non-linear crystal 18 contains the phase difference between spectral components of the pulse separated by the spectral shear, as well as the delay-induced spectral fringes from the temporal shear, which allows for the direct (non-iterative) extraction of the input pulse spectral phase using a Fourier transform-based algorithm. This spectral phase, in conjunction with a measure of the pulse spectral amplitude by the spectrometer, constitutes a full measurement, i.e. characterization, of the spectral or temporal electric field of the pulse.

Further information regarding SPIDER apparatus can be gleaned from U.S. Pat. No. 6,633,386.

Although the above apparatus works perfectly satisfactorily, there are a number of drawbacks. There are a large number of optical components which need to be precisely set up. The apparatus cannot be made particularly compact. It requires a chirped pulse, so requires a grating stretcher which is generally inefficient. The non-linear crystal needs to be very thin, for example a few hundred microns or less, which further limits the up-conversion efficiency.

It is an object of the present invention to alleviate, at least partially, some or any of the above problems.

Accordingly the present invention provides:

a pulse measurement apparatus comprising:

a splitter for splitting a pulse to be measured into two sub-pulses propagating along different beam paths;

a non-linear medium, capable of up-conversion of radiation propagating therethrough, arranged in said beam paths; wherein each sub-pulse can be resolved into an o-wave component and an e-wave component propagating through the medium at a predetermined angle, and wherein the phase-matching function for up-conversion by interaction of the o-wave component with the e-wave component in the non-linear medium is such that up-conversion is substantially independent of frequency for one of the o-wave or e-wave over a predetermined frequency range, and is frequency selective for the other of the o-wave and e-wave;

at least one element for interfering the up-converted pulses resulting from propagation of the two sub-pulses in the non-linear medium; and detection apparatus for detecting the result of the interference to obtain at least one of spectral and temporal characteristics of the pulse to be measured.

A further aspect of the invention provides:

a method of pulse measurement comprising:

splitting a pulse to be measured into two sub-pulses propagating along different beam paths;

generating spectrally sheared up-converted versions of the sub-pulses by arranging in said beam paths a non-linear medium, capable of up-conversion of radiation propagating therethrough; wherein each sub-pulse can be resolved into an o-wave component and an e-wave component propagating through the medium at a predetermined angle, and wherein the phase-matching function for up-conversion by interaction of the o-wave component with the e-wave component in the non-linear medium is such that up-conversion is substantially independent of frequency for one of the o-wave or e-wave over a predetermined frequency range, and is frequency selective for the other of the o-wave and e-wave;

interfering the up-converted pulses resulting from propagation of the two sub-pulses in the non-linear medium; and detecting the result of the interference to obtain at least one of spectral and temporal characteristics of the pulse to be measured.

The invention eliminates the need for a chirped pulse, which simplifies the optics and does not require the beam stretcher. The simplified optics mean that the device can be made much more compact, for example with a device size of about 15 cm by 5 cm by 3 cm. The invention requires a much thicker non-linear crystal to be used, for example 2 cm thick, which is much more robust and easier to handle, so is cheaper to fabricate, simpler to install in the device and has a longer life.

Embodiments of the invention will now be described, by way of non-limitative example, with reference to the accompanying drawings, in which:

FIG. 2b is a schematic side-view of the apparatus of FIG. 2a;

FIG. 3b is a schematic side-view of the apparatus of FIG. 3a;

Figure 4:
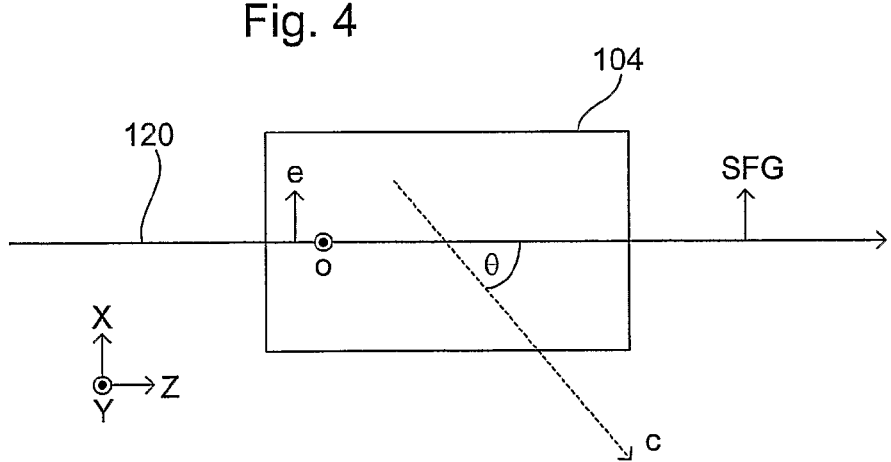
Figure 5:
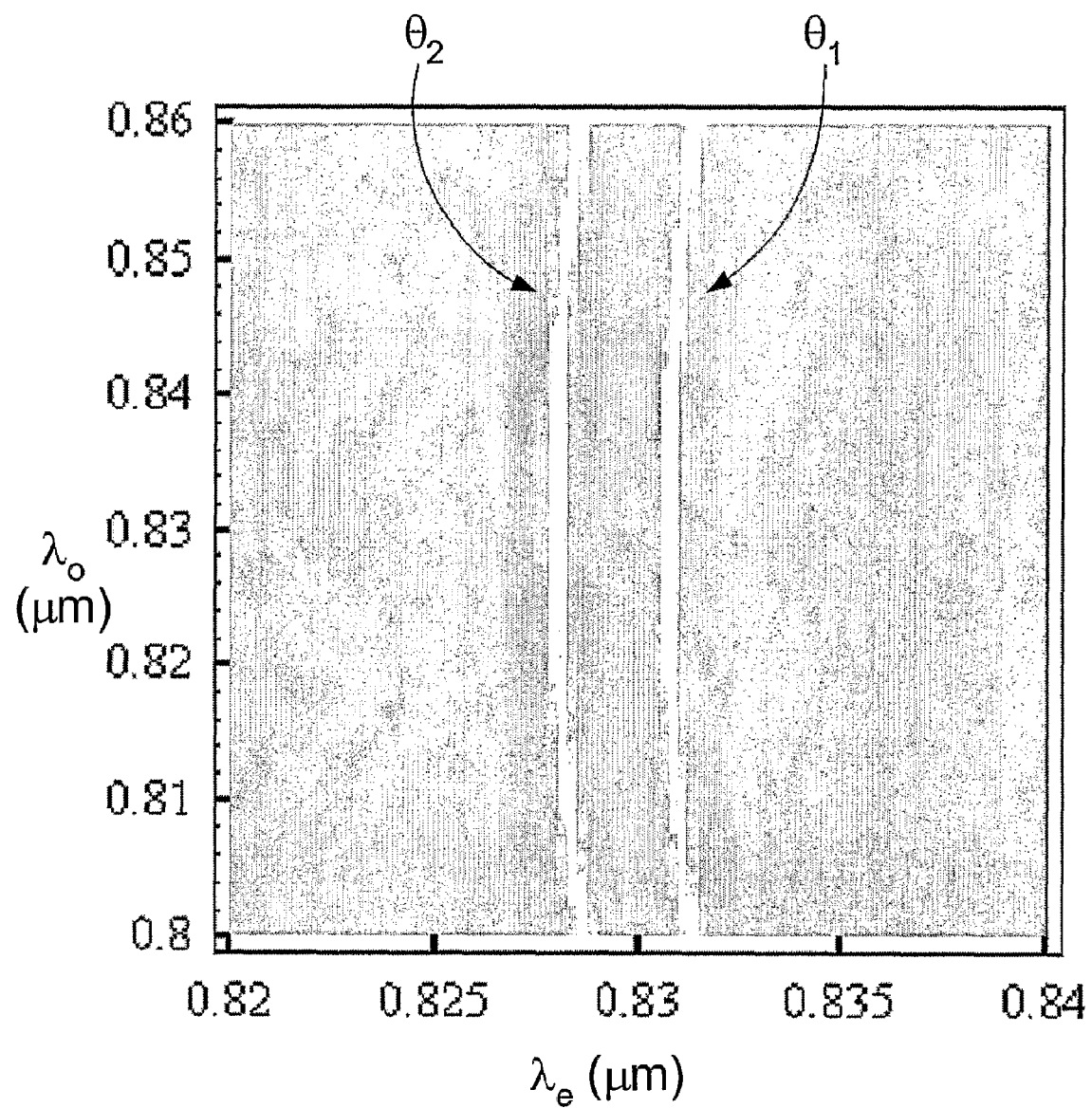

FIG. 4 is an explanatory diagram showing the relative orientations of the optic axis of the non-linear crystal with respect to polarised components of light propagating in the non-linear crystal; and FIG. 5 is a plot of the phase-matching function for collinearly propagating o- and e-continuous waves in the non-linear crystal for two particular different angular orientations of the propagation direction relative to the crystal optic axis.

Figure 1:
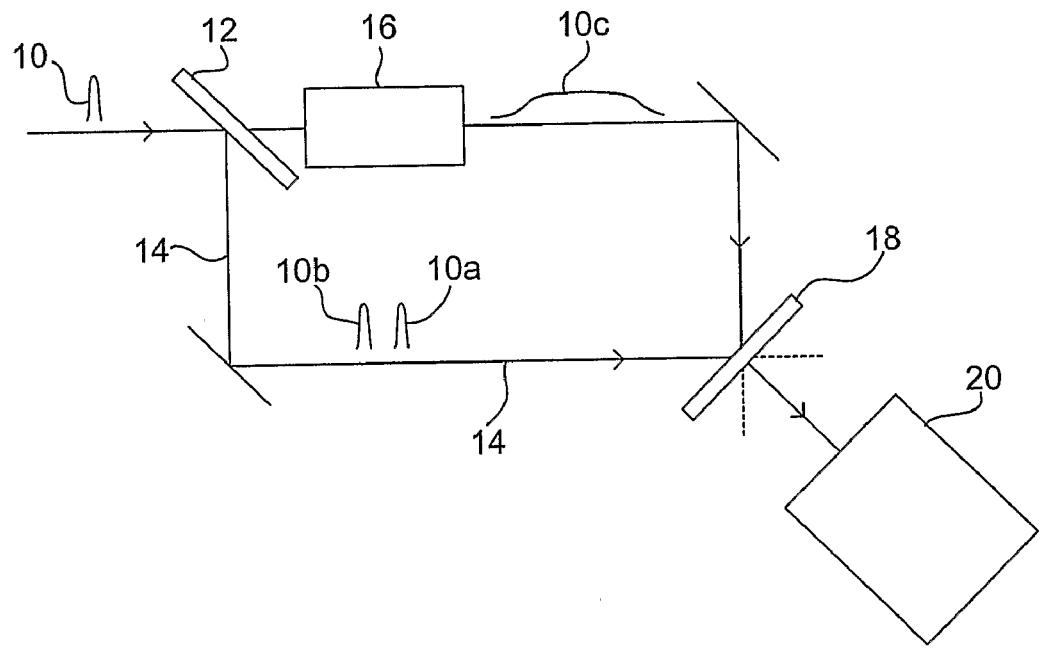
FIG. 1 shows a prior art pulse measurement apparatus.
Figure 2A:
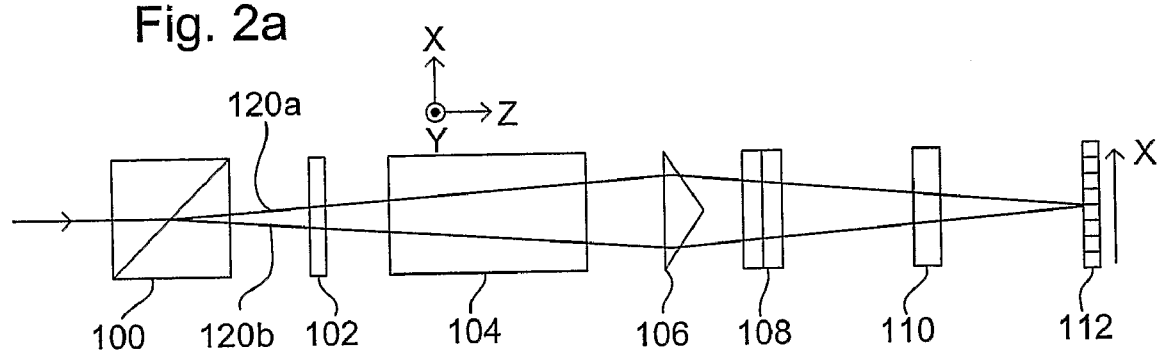
FIG. 2a is a schematic top-view of an apparatus according to an embodiment of the present invention.
Figure 2B:
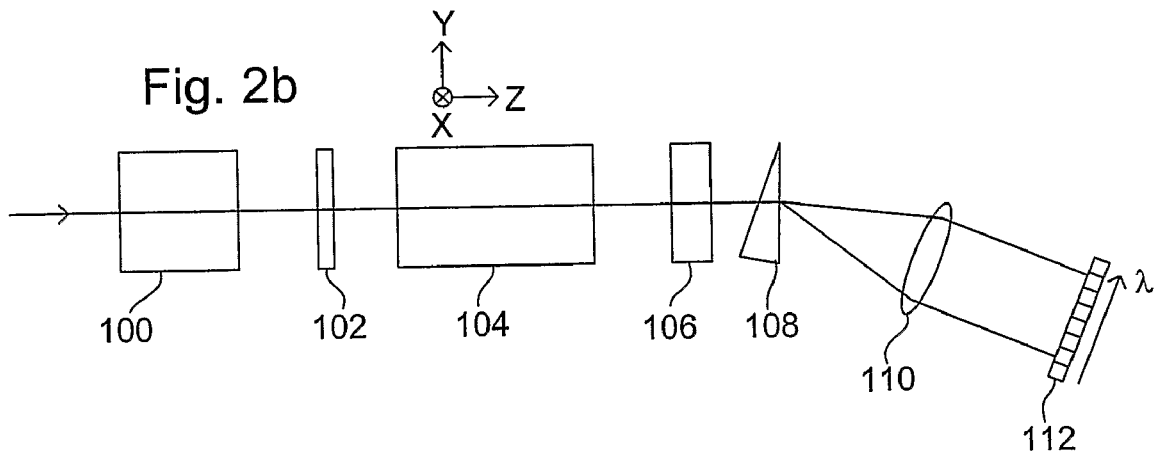

FIGS. 2 and 3 are schematic views of apparatus according to two embodiments of the invention. The letters "a" and "b" suffixed to the figure numbers denote top and side views, respectively, of the same apparatus. The labels "top" and "side" are, of course, purely arbitrary and do not imply that the apparatus must operate in a particular orientation. In FIGS. 2 and 3, like parts are denoted with like reference numerals. The first apparatus (FIGS. 2a and 2b) consists of the following components in series:

a polarizing beam-splitter 100; a half-wave plate (λ/2-plate) 102; a crystal 104 of a non-linear medium; a Fresnel biprism 106; a wavelength dispersive prism 108; a cylindrical lens 110; and a detector array 112, such as a charge-coupled device (CCD) camera chip.

In the second apparatus (FIGS. 3a and 3b), the polarizing beam-splitter is replaced by: two mirrors side by side with a slight tilt between them 114, which constitute a splitter; and a plane mirror 116. The term "mirror" used herein refers to any reflector element or surface suitable for the radiation in question.

Figure 3A:
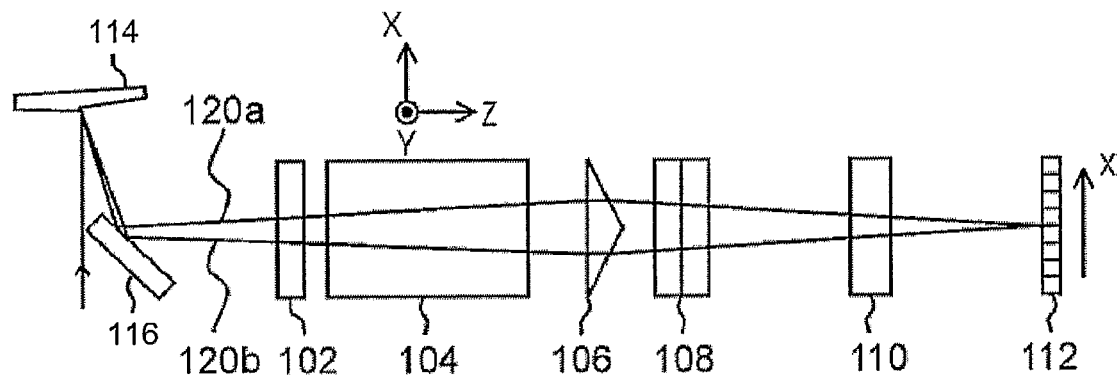
FIG. 3a is a schematic top-view of an apparatus according to a second embodiment of the present invention.
Figure 3B:
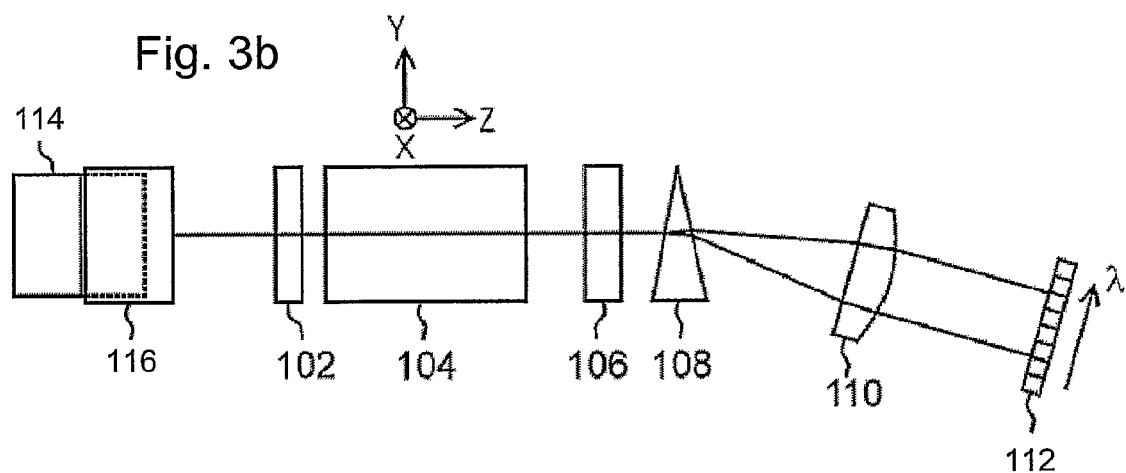

In the discussion of the two embodiments with reference to FIGS. 2, 3 and 4, the following convention will be adopted: the direction of propagation of the radiation will be referred to as the Z direction; the X direction will be in the plane of the paper in FIGS. 2a, 3a and 4 (normal to the plane of the paper in FIGS. 2b and 3b); and the Y direction will be normal to the plane of the paper in FIGS. 2a, 3a and 4 (in the plane of the paper in FIGS. 2b and 3b).

An ultrashort pulse, which it is desired to measure, enters the apparatus sketched in FIGS. 2a and 2b from the left. The polarizing beam-splitter 100 splits the pulse into two replicas, or sub-pulses, propagating along beam-paths 120a and 120b, and whose directions of propagation deviate from each other by a small angle. The two sub-pulses are mutually orthogonally linearly polarised, one in the X direction and one in the Y direction. In the illustrated embodiment, a Wollaston prism is used as the polarizing beam-splitter 100, but a thin-film polarizing beam-splitter can alternatively be used. The Wollaston prism is particularly suitable for pulses with duration above 70 femto seconds. For pulses below 70 femto seconds, the Wollaston prism is replaced by two mirrors side by side 114 (see FIGS. 3a and 3b). A slight tilt between these two mirrors enables the pulse to be split in to two replicas. The flat mirror 116 receives the two beams and sends them into the non-linear crystal 104. The remaining parts of the two apparatus sketched in FIGS. 2 and 3 are identical to each other.

The two replica sub-pulses are then incident on the half-wave plate 102. The angle between the two beam-paths is typically quite small, such as less than two degrees, so that the two beam-paths are effectively both normally incident on the half-wave plate. The half-wave plate is sufficiently broadband in operation that it functions for the different wavelength (frequency) components in the incident pulse, which depends on the duration of the pulse. Preferably the half-wave plate is a zero-order waveplate. The half-wave plate lies in the XY plane but its optic axis is rotated about the Z axis, such that the optic axis of the half-wave plate does not lie along the X or Y directions. Preferably, the optic axis of the half-wave plate is at 22.5° from either the X or Y axes. This will have the effect that the plane of polarisation of one of the pulses along beam-paths 120a, 120b will be rotated by 45° about the Z axis, and the plane of polarisation of the other pulse will be rotated by 135° about the Z axis. The result is that the pulses emerging from the half wave plate 102 are mutually orthogonally linearly polarised, but at 45° with respect to either the X or Y axes (the pulses are diverging from each other in the XZ plane). Other angles apart from 45° could, of course, be used, and the precise choice of angle can be optimised depending on the particular non-linear crystal, but the requirement is that each emergent pulse has a polarisation that can be resolved into a component parallel to the X axis and a component parallel to the Y axis. This will be required for the mixing and sum frequency generation in the non-linear crystal 104 to be explained next.

Considering just one or other of the two pulse beam-paths 120a or 120b, labelled 120 in FIG. 4, FIG. 4 shows the geometry with respect to the non-linear crystal 104 in more detail. The optic axis of the non-linear crystal 104 is indicated by the dashed arrow c which lies in the XZ plane. The incident radiation is propagating in the Z direction. The crystal 104 is cut such that the radiation is substantially normally incident and emergent from faces of the crystal and such that the direction of propagation, i.e. the Z direction, forms a specific angle e with the optic axis C of the material of the crystal. The incident radiation is polarised in a direction, for example at 45° to the X and Y axes. Within the crystal 104, this radiation can be resolved into an o-wave component polarised perpendicular to the c-axis (i.e. in the Y direction), and an e-wave component polarised perpendicular to the O-ray (i.e. in the X direction). The non-linear crystal is uniaxial and birefringent so the o-wave and e-wave (ordinary wave and extraordinary wave) experience different effective refractive indices and so propagate at different velocities. The o-wave and e-wave effectively constitute independent collinearly propagating waves. Under appropriate phase matching conditions, interaction between the o-wave pulse and the e-wave pulse can occur to produce an up-converted pulse at the sum of the frequencies of the input pulses, known as sum frequency generation (SFG). The emergent up-converted pulse is polarised parallel to the e-wave and is indicated by SFG in FIG. 4.

The material of the non-linear crystal 104 and the angle θ are chosen to produce a very specific phase matching function (PMF) for up-conversion for input radiation of a particular wavelength range. The PMF is nearly vertical (i.e. steep-sided) and is simultaneously very broad along the o-axis and very narrow along the e-axis. Such highly asymmetric PMF shape is due to a group velocity match between the o-fundamental input and the e-up-converted output field, and a group velocity mismatch between the o-fundamental and the e-fundamental input fields.

Referring to FIG. 5, this shows superimposed two contour plots of the amplitude of the PMF for different values of the angle θ. The wavelength of the e-wave pulse is plotted horizontally and the wavelength of the o-wave pulse is plotted vertically. The darker regions show a low propensity for the collinearly propagating o- and e-waves to mix, and the light regions show a high propensity for mixing to produce the sum frequency. For radiation propagating at an angle $\theta_1$, the mixing is very specific to a narrow portion of the e-wave around a wavelength of 831 nm, but mixing occurs across a broad range of wavelengths of the o-wave. The same is true for collinear pulses propagating at a different angle $\theta_2$, but in this case mixing of the o-wave occurs with a different wavelength of the e-wave. If an ultra short pulse is centred near 830 nm, the unique shape of the PMF in FIG. 5 allows for the entire bandwidth of the o-wave to mix with a quasi-monochromatic portion of the e-wave spectrum. The crystal rotation can be used to tune the centre wavelength of the sum frequency generation (SFG).

In this specific example, the non-linear crystal is approximately 2 cm long and is formed of KDP (potassium dihydrogen phosphate). It is cut such that the angle θ is approximately 68° to provide maximum up-conversion for radiation with a free-space wavelength in the region of 830 μm. Pulses travelling along the two beam-paths 120a and 120b in FIGS. 2a (3a) are propagating at the angles $\theta_1$ and $\theta 2$ referred to in FIG. 5 and differ by approximately + and −0.125° from the above-mentioned angle θ, respectively, i.e. differ by approximately 0.25° from each other.

Thus the entire spectrum of the o-component of one of the pulses propagating at an angle $\theta_1$ is up-converted by a frequency corresponding to that of a wavelength of 831 nm, and the entire spectrum of the o-component of the other pulse propagating at angle $\theta_2$ is up-converted by a different amount corresponding to the frequency of the radiation at approximately 829 nm. The specified phase-matching function means that the up-conversion is highly frequency selective, and the specific frequency by which the o-wave pulse spectrum is up-converted is dependent on the angle of propagation. Thereby two sum-frequency pulses are generated that are replicas of the input pulse, but up-converted by different frequencies such that they are spectrally sheared with respect to each other.

FIG. 5 shows the amplitude of the PMF. This specific asymmetric PMF is the result of a group velocity match between the o-fundamental input and the e-up-converted output field, as well as a large group velocity mismatch between the o-fundamental and e-fundamental input fields. To obtain a complete waveform transfer from the o-fundamental input to the e-up-converted output field, i.e. to produce a replica of the original pulse that is up-converted, the e-fundamental pulse must go entirely through the o-fundamental pulse during the propagation in the non-linear crystal. To satisfy this requirement, according to this embodiment of the invention, it is necessary first to pre-delay one of the o-wave and e-wave components with respect to the other by a delay time approximately equal to the temporal window that includes entirely the unknown pulse. Secondly the crystal length must be at least equal to twice the walk-off time due to the different propagation velocities, divided by the duration of the previous temporal window. In the case of KDP the e-wave must be pre-delayed with respect to the o-wave, and the walk-off time is roughly 1.5 pico seconds per cm of material. The pre-delay can be achieved by an optical element preceding the non-linear crystal that delays orthogonally linearly polarized components with respect to each other (the orthogonally linearly polarized components become the e-wave and o-wave in the non-linear crystal). A suitable Wollaston prism as the beam-splitter 100 inherently produces a delay. Alternatively a suitable additional birefringent material or waveplate can be used.

The up-conversion process can also be used at wavelengths that do not satisfy the criterion of group velocity matching between the o-fundamental and the e-up-converted field, as long as there is a group velocity mismatch between the e-fundamental and the o-fundamental fields. In such a case, the e-up-converted output field is a stretched replica of the o-fundamental input pulse. The stretching factor is material dependent and a reverse stretching factor can be applied to recover the desired information about the original pulse. This allows one to extend the applicability of the apparatus to a spectral region centred around the wavelength that satisfies the PMF requirement.

Other types of non-linear crystal materials can also satisfy the above-mentioned PMF requirement in different wavelength ranges. For example, in the case of degenerate collinear type-II arrangement, which is that discussed above for KDP: the common non-linear uniaxial crystal beta-barium borate (BBO) will be applicable for pulses centered in the spectral regions of 1.17 μm and 1.95 μm; deuterated potassium dihydrogen phosphate (KD*P) for pulses centered in the spectral regions of 0.95 μm and 1.83 μm. Additional crystal examples and calculations can be found in *Eliminating Frequency and Space-time Correlations in Multiphoton states*, W. P. Grice, A. B. U'Ren and I. A. Walmsley, Physical Review A, vol. 64, 2001. A non-collinear type-I interaction can also be implemented (see *Sub-5 fs Pulse Generation from a Non-collinear Optical Parametric Amplifier*, T. Kobayashi, A. Baltushka, Measurement Science and Technology, vol. 13, pg. 1671, 2002 and references therein). Bi-axial crystals can be utilized as well, further extending the set of applicable spectral regions. For example, lithium triborate (LBO) is applicable for pulses centred in the spectral regions of 0.91 μm, 0.98 μm and 1.77 μm.

The spectral shearing has now been achieved, and two sum frequency pulses are now propagating in different directions separated by the difference between angles $\theta_1$ and $\theta_2$; this angular separation provides scope for temporal shearing because different path lengths correspond to different delay times. The remaining components in FIGS. 2 and 3 essentially constitute a two-dimensional imaging spectrometer. The Fresnel biprism 106 brings the two diverging pulse beams back to convergence on the CCD detector array 112 where they can produce an interference pattern. The dispersive prism 108 angularly spreads the different spectral components of the sheared pulses and the cylindrical lens 110 converts this to a spatial separation on the CCD array 112. Other configurations of spectrometer may be used.

In FIGS. 2b and 3b, each pixel in one column of the CCD array 112 corresponds to a different wavelength λ (or frequency) slice of the interfering spectrally-sheared pulses. As shown in FIGS. 2a and 3a, the two up-converted pulses will have wave fronts tilted with respect to each other that will lead to fringes when they interfere at the CCD array 112, such that each pixel in one row of the CCD detector array 112 corresponds to a different path-length-difference between the two pulses, i.e. a different temporal shear has been converted to a spatial interference pattern. Fourier processing of the resulting spatio-spectral fringe pattern yields the desired phase information about the original pulse. It is possible to extract the temporal dependence of the field at each spatial point within the beam as well as a measurement of the pulse spectrum at the same point using known processing techniques. Further information on obtaining the desired characterisation of the input pulse from the signal of the detector array can be obtained from, for example, *Self-referencing Spectral Interferometry for Measuring Ultra Short Optical Pulses* see Iaconis and I A Walmsley, IEEE Journal of Quantum Electronics, vol. 35, no. 4, April 1999.

Thus using the described apparatus and method according to the invention, it is possible to obtain a full measurement of the spectral or temporal electric field of the pulse, without it being necessary to use a stretched replica of the pulse.

The invention clamed is

1. A pulse measurement apparatus comprising:
    a splitter for splitting a pulse to be measured into two sub-pulses propagating along different beam paths;
    a non-linear medium, capable of up-conversion of radiation propagating therethrough, arranged in said beam paths;
    wherein each sub-pulse is resolvable into an o-wave component and an e-wave component propagating through the medium at a predetermined angle, and wherein a phase-matching function for up-conversion by interaction of the o-wave component with the e-wave component in the non-linear medium is such that up-conversion is substantially independent of frequency for one of the o-wave or e-wave over a predetermined frequency range, and is frequency selective for the other of the o-wave and e-wave;
    at least one element for interfering the up-converted pulses resulting from propagation of the two sub-pulses in the non-linear medium; and
    detection apparatus for detecting the result of the interference to obtain at least one of spectral and temporal characteristics of the pulse to be measured.

2. A pulse measurement apparatus according to claim 1, wherein the frequency at which the phase-matching function for up-conversion of the non-linear medium is frequency selective, for one of the o-wave or e-wave, is dependent on the angle of propagation of the radiation relative to the optic axis of the non-linear medium.

3. A pulse measure apparatus according to claim 1, wherein the non-linear medium is oriented such that the predetermined angle of propagation of each sub-pulse satisfies the condition that there is a group velocity mismatch between the input sub-pulse o-wave and the input sub-pulse e-wave.

4. A pulse measure apparatus according to claim 1, wherein the non-linear medium is oriented such that the predetermined angle of propagation of each sub-pulse satisfies the condition that there is a group velocity match between the input sub-pulse o-wave and the up-converted e-wave.

5. A pulse measurement apparatus according to claim 1, wherein the angles of propagation of the two sub-pulses in the non-linear medium are selected such that each sub-pulse experiences a different frequency-selective phase-matching for up-conversion, to produce up-converted pulses that are spectrally sheared with respect to each other.

6. A pulse measurement apparatus according to claim 5, wherein the spectrally sheared pulses are spatially displaced with respect to each other.

7. A pulse measurement apparatus according to claim 1, wherein the splitter produces sub-pulses that are substantially identical, temporally and spectrally, to the pulse to be measured.

8. A pulse measurement apparatus according to claim 1, wherein the splitter comprises one of: a Wollaston prism; and a pair of mirrors side by side tilted with respect to each other.

9. A pulse measurement apparatus according to claim 1, further comprising a waveplate for orienting the plane of polarization of both the sub-pulses such that each sub-pulse has an o-wave component and an e-wave component in the non-linear medium.

10. A pulse measurement apparatus according to claim 1, further comprising a dispersive prism for spectrally analyzing the interfering up-converted pulses.

11. A pulse measurement apparatus according to claim 1, wherein the detection apparatus comprises a two dimensional detector array for measuring the spectral and spatial interference of the two up-converted pulses.

12. A pulse measurement apparatus according to claim 1, wherein the beam-paths of the two sub-pulses propagating in the non-linear medium are non-collinear, and the angle between the beam-paths is less than 2°.

13. A pulse measurement apparatus according to claim 1, wherein the non-linear medium is capable of up-conversion of radiation by sum frequency generation.

14. A pulse measurement apparatus according to claim 1, wherein the non-linear medium is comprised of at least one selected from the group consisting of KDP, KD*P, BBO and LBO.

15. A pulse measurement apparatus according to claim 1, wherein the predetermined angle of propagation of each of the two sub-pulses in the non-linear medium is in the range of 65° to 70° with respect to the optic axis of the medium.

16. A pulse measurement apparatus according to claim 1, wherein the non-linear medium is at least 5 mm thick.

17. A pulse measurement apparatus according to claim 1, wherein the pulse to be measured is sub-picosecond in duration.

18. A method of pulse measurement comprising:
    splitting a pulse to be measured into two sub-pulses propagating along different beam paths;
    generating spectrally sheared up-converted versions of the sub-pulses by arranging in said beam paths a non-linear medium, capable of up-conversion of radiation propagating therethrough;
    wherein each sub-pulse is resolvable into an o-wave component and an e-wave component propagating through the medium at a predetermined angle, and wherein a phase-matching function for up-conversion by interaction of the o-wave component with the e-wave component in the non-linear medium is such that up-conversion is substantially independent of frequency for one of the o-wave or e-wave over a predetermined frequency range, and is frequency selective for the other of the o-wave and e-wave;
    interfering the up-converted pulses resulting from propagation of the two sub-pulses in the non-linear medium; and
    detecting the result of the interference to obtain at least one of spectral and temporal characteristics of the pulse to be measured.

* * * * *